March 7, 1967   D. COSTABELLO ET AL   3,308,167
PROCESS FOR THE PRODUCTION OF PHENOL FROM BENZOIC ACID
Filed Nov. 23, 1962
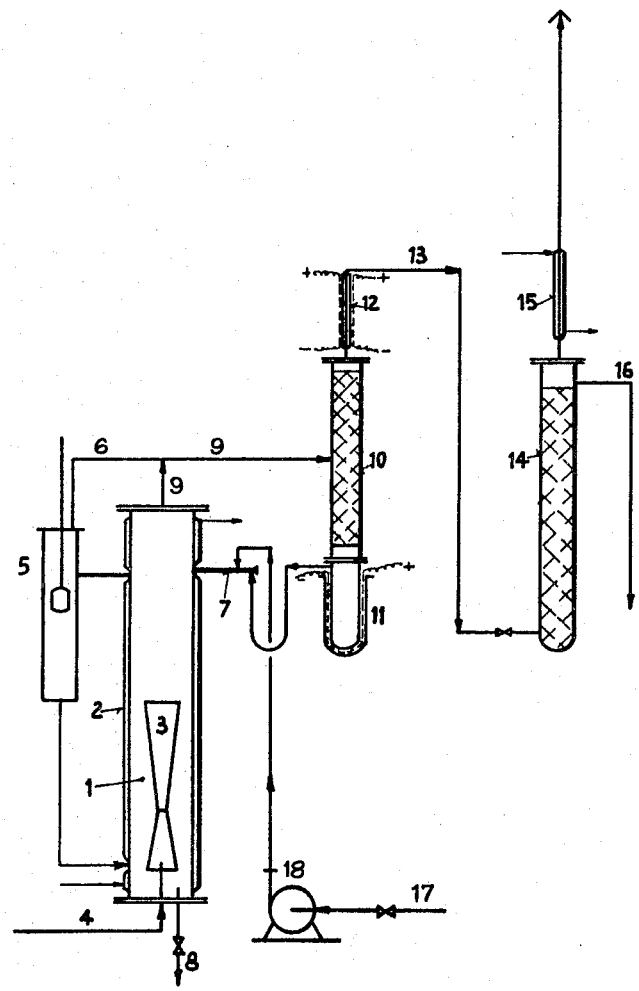
INVENTORS
Dino Costabello,
Aldo Forni,
Piero Ramello 3,308,167
PROCESS FOR THE PRODUCTION OF PHENOL FROM BENZOIC ACID
Dino Costabello and Aldo Forni, Novara, and Piero Ramello, Turin, Italy, assignors to Montecatini Edison S.p.A., Milan, Italy
Filed Nov. 23, 1962, Ser. No. 239,458
Claims priority, application Italy, Nov. 27, 1961, 21,273/61
1 Claim. (Cl. 260—621)

Our invention relates to an improved process for producing phenol by oxidation of benzoic acid, by air or oxygen-containing gases in the presence of copper salts and promoters of different kind.

It is known that phenol can be obtained from benzoic acid by treating molten benzoic acid with an oxidizing gas, preferably air, and steam at 200–250° C. A copper salt soluble in the molten acid is used as a catalyst. A compound selected from the group consisting of the salts of MG, Na, K, Co, Sn, preferably a salt of Mg or Co, is used as a promoter. The catalyst is preferably employed in amounts between 1 and 5% of the molten acid, whereas the promoter is present in a ratio of 0.004–0.17 mols per mol of molten acid.

The relatively low yields (80–85%) of the above process are caused, in part, by the formation of benzene and, especially, by the formation of pitches.

We have found, and this is the object of our invention, an improved process by which we obtain phenol from molten benzoic acid, with a very low formation of pitches and, therefore, with yields above 85%. This surprising result is reached essentially by:

(1) use of a suitable material for the construction of the reactor;
(2) a short residence time of the phenol, which has been formed, in the reaction zone;
(3) homogeneous heating of the reactor.

We have found that almost all construction materials, besides being subject to strong corrosive action, negatively affect the yields and promote the formation of large quantities of pitch. We have found that Hastelloy C is resistant to corrosion by the reaction and furthermore does not promote the formation of pitch.

We achieve the short residence time of phenol in the reactor by keeping a low phenol concentration in the mixture and rapidly removing the phenol formed. This result is realized:

By working at the lowest possible pressure, compatible with the reaction temperature, which is between 220 and 300° C.; it is preferred to work at atmospheric pressure and at a temperature of 230–250° C.;

By using a high flow of gas and steam. We preferably use diluted oxygen, or even more preferable, diluted air, with an amount of steam at least equal to the amount of the phenol produced. The dilution of the oxidizing gas may be carried out by recycling a portion of the reacted gases, from which phenol has been removed, to the reactor. The ratio by volume at the outlet of the reactor between inert gases+steam to phenol is between 10:1 and 30:1, and preferably between 15:1 and 20:1. The steam has also the effect of keeping the concentration of the phenyl benzoate in the reactor low, and therefore also in the drainage;

By sending the gases and vapors, from the reactor, to a continuous distillation column. The tail fraction is benzoic acid which is recycled to the reactor. Phenol and inert gas are obtained at the top of the column. The column operates under such conditions that the benzoic acid, to be recycled, is free from phenol.

We have also found that the heating system used also affects the formation of pitches. In laboratory tests carried out by using flasks heated by a direct flame, large amounts of pitches were obtained, i.e. 30–50 g. per 100 g. of phenol produced. It is, therefore, necessary that the reactor be homogeneously heated, to avoid local overheating. A preferred heating system comprises a bath of high boiling liquids (e.g. Dowtherm) or of molten salts.

A more complete description of the process of our invention follows: Benzoic acid containing 0.1–2.5% of CuO and an equal amount of MgO is continuously fed to a reactor, constructed of or lined with Hastelloy C. The reactor is provided with an external jacket wherein the thermostatic fluid is circulated. The catalyst concentration is determined so as to compensate for the catalyst eliminated in the drainage. It is kept between 0.5 and 3%, preferably between 1 and 2%, with respect to the reaction mixture. The mixture is drained in order to avoid pitch accumulation. Pitches are removed from the drainage while benzoic acid and catalysts are recovered. The reaction is carried out at atmospheric pressure and at temperatures from 230 to 250° C. The oxidizing gas consists of oxygen or air, diluted by recycling a portion of the reacted gases. The oxygen flow is between 2 and 20 l./h. per kg. of mixture. The recycled gas is about 2–4 times the amount of fresh air fed. The steam introduced is from 100 to 250 g. per 100 g. of phenol produced, and corresponds to about 5–10 g. of water per liter of oxygen or to 20–150 g./h. per kg. of reaction mixture. The inert gases and vapors, coming out of the reactor, are sent to a distillation column in order to separate the unreacted benzoic acid and the phenol. The benzoic acid is recycled to the reactor. Phenol and the inert gases, which come out of the distillation column, pass through a cooled column, filled with water, which retains the phenol and releases the inert gases. A portion of these inert gases is recycled to the reactor while the remainder is eliminated. Phenol is separated from the aqueous phenol solution by conventional techniques.

The figure shows pilot plant apparatus for carrying out the invention.

The following examples are to illustrate, but not to limit, our invention. Examples 1, 2, 3 and 4 show the influence of the different parameters i.e. construction materials, water flow, pressure, homogeneous heating. In these examples, the phenol yield is expressed as a percentage ratio between the mols of the produced phenol and the mols of the reacted acid; these are calculated as the sum of the phenol produced (in mols), the pitches (calculated as benzoic acid) and benzene (equal mols of benzoic acid). The yields are high because the tests are carried out in batches for short periods of time, using pure products (i.e. in the absence of pitches). By continuing the tests, the yields decrease due to increase of pitch formation. Examples 5 and 6 describe two runs carried out according to the process of the present invention. In these examples, the yield of phenol is calculated according to the method generally used which is the ratio between the produced phenol and the benzoic acid consumed.

*Example 1*

A series of laboratory tests was carried out, always under the same conditions, in order to show the influence of the construction materials. The apparatus comprised a 1-liter, 3-necked glass flask, provided with a pipe immersed in the liquid for the introduction of the air, a thermometer and an empty short column for the outlet of the reaction gases, heated by means of an electric resistance. The following reagents were introduced into the flask:

| | G. |
|---|---|
| Benzoic acid | 500 |
| Cupric oxide | 6 |
| Magnesium oxide | 6 |

Shavings of different metals were also introduced; these shavings had a surface of 0.11 m.² per liter of the reaction liquid. The reaction was carried out at 240° C. and under atmospheric pressure, with an air flow of 47 l./h., for 9.5 hours. The homogeneous heating of the flask was obtained by means of a bath of molten salts ($KNO_3$ 10 parts-$NaNO_2$ 8.5 parts). The outlet column was maintained at 150–160° C., in order to recycle into the reactor the entrained benzoic acid and allow the outlet of the phenol. The residue, which remained in the flask, contained the non-converted benzoic acid, phenyl benzoate, Cu and Mg benzoate and the pitches. The residue was analyzed in respect of its content of pitches.

| Material: | Pitches formed, g.[1] |
|---|---|
| Without shavings | 2.2 |
| Stainless steel Inox 18/8/2 | 19.6 |
| Monel | 13.2 |
| Inconel | 11.3 |
| Hastelloy B | 8.5 |
| Titanium | 6.1 |
| Hastelloy C | 2.2 |

[1] In g. per 100 g. of phenol produced.

All of the materials tested, with the exception of Hastelloy C, exhibited marked corrosion. A sample of aluminum, which was also tested, was completely destroyed.

*Example 2*

A series of tests was carried out in order to determine the influence of the water on the yields and on the formation of pitches. The runs were carried out under the same conditions described in Example 1 and using the same apparatus, in the presence of shavings of Hastelloy C, but varying the amounts of water fed. The water was fed in form of steam, together with air. The following results were obtained:

| Water, cc./h | 0 | 5 | 10 | 20 |
|---|---|---|---|---|
| Pitches formed, g./100 g. phenol | 2.5 | 1.84 | 1.64 | 1.4 |
| Yield of phenol, percent | 96.2 | 96.8 | 97.0 | 97.2 |

The results show that the addition of water has a good influence, but is is not advisable to exceed 250 g. of water per 100 g. of phenol produced, because no significant advantage is achieved thereby.

*Example 3*

The following tests show the influence of pressure on the formation of the pitches. A 1-liter autoclave constructed with Hastelloy C and provided with agitator, thermometer, inlet pipe and outlet for the gases, and heating jacket, was used. The following amounts of reactants were introduced:

| | G. |
|---|---|
| Benzoic acid | 500 |
| Cupric oxide | 5 |
| Magnesium oxide | 5 |

Dowtherm at 250° C. was introduced into the heating jacket in order to maintain a reactor temperature of about 245° C. 50 l./h. of air and 50 cc./h. of water were added to the reactor. In the runs, carried out at atmospheric pressure, 4.8–6.5 g. pitches per 100 g. of produced phenol were found, with a phenol yield of 90–95%. In the runs carried out at 2 atmospheres 30–50 g. pitches per 100 g. of produced phenol were obtained, and the phenol yield was 66–76%. The formation of pitches was higher than usual, even when the runs were carried out at atmospheric pressure, since the acid used was not very pure.

*Example 4*

The following runs show the importance of the homogeneous heating. A 4-necked, 500 cc. glass flask, provided with an immersed pipe for the inlet of the gases, agitator, thermometer and outlet column, filled with glass balls up to the height of 20 cm., was used. The column was used for refluxing most of the benzoic acid entrained by the vapors. The flask was heated with direct flame on a Bunsen burner. The following substances were introduced:

| | G. |
|---|---|
| Benzoic acid | 200 |
| Copper benzoate | 17.5 |
| Magnesium oxide | 5.2 |

During the run of the duration of 10 hours, an additional 200 g. of benzoic acid, at a rate of 50 g. every two hours, were added in order to keep the level constant. 35 l./h. of air and 60 g./h. steam, preheated at about 200° C. were introduced. At the end of the run, 88 g. phenol were obtained and 8 g. phenyl benzoate were in the condensate product (yield 86% of phenol calculated on the converted acid). The amount of pitches, contained in the residue in the flask, was 13 g., corresponding to 14.1 g. of pitches for 100 g. of phenol produced. The run, repeated under the same conditions, but homogeneously heating all the flask by means of a molten salts bath, gave 2.5 g. of pitches for 100 g. of phenol produced, with a phenol yield of 97%.

*Example 5*

A run carried out in a pilot plant is described (see figure). The reactor 1, a vertical tube of Hastelloy C, has an inner diameter of 9 cm., a height of 220 cm., a capacity of 13.8 liter, and is provided with a jacket 2 for the circulation of Dowtherm A. Inside the tube an ejector 3 is placed provided with a nozzle for the introduction of air and steam. This device aids in the intimate mixing of the gas with the liquid in the reactor and the agitation of the mixture. The reactor has on the side a float 5 which indicates the height of the liquid in the reactor. On one side, near the head, is pipe 7, for feeding benzoic acid. From the bottom of the reactor a discharge pipe 8 is used for drainage. On the head, pipe 9 is an outlet for gases and vapors which pass to column 10 for distillation. The distillation column has a diameter of 8 cm. and a height of 150 cm., and is filled with Raschig rings. The column is provided at the bottom with a reboiler 11 and at the head with a condenser 12. The gases and phenol, which come out of the distillation column, are sent through the pipe 13 to condensation column 14, which is filled with water. The aqueous solution of phenol is discharged from the overflow 16; the inert gases go out through the cooler 15 and are then partially recycled to the reactor 1, while the remainder is exhausted.

In the pilot plant just described, a run was carried out without drain (and therefore under unfavorable conditions because of the accumulation of pitches). The feed was a residue of preceding runs and consisted of about 10 litres of molten benzoic acid, containing 1% CuO, 1.5% MgO and 11.09% pitches. The conditions, under which the run was carried out, were the following:

| | |
|---|---|
| Air flow | 200 l./h., atmospheric pressure. |
| Steam flow | 400 g./h., temperature 240° C. |
| Recycle gas flow | 500 l./h., duration 67 h. |

At the end of the run, after having fed 16.32 kg. of benzoic acid, the level of the reacting mixture in the reactor was equal to the initial level. The content of pitches at the end was 17.95%. The phenol produced was 11.82 kg. and corresponds to 15.35 kg. of benzoic acid. The pitches produced were 1.03 kg. corresponding to 1.25 kg. of benzoic acid. The yield was therefore 15.35×100 (16.32+1.25), i.e. 87%.

*Example 6*

In this run with drainage, the reactor described in the preceding example was operated (under the conditions hereinafter specified) until the constant running conditions were reached, namely until the content of the pitches was constant. At this point the charge in the reactor consisted of about 10 liters molten benzoic acid, containing 1% CuO, 2% MgO and 10.4% of pitches. The feed consisted of:

| | |
|---|---|
| Benzoic acid | (¹) |
| Air _____l./h__ | 200 |
| Recycle gas _____l./h__ | 750 |
| Steam _____g./h__ | 200 |

¹ About 0.38 kg./h., containing about 0.36% CuO and about 0.72% MgO.

The run was carried out at atmospheric pressure, at 240° C. and by draining 140 g./h. of the mixture. The run was continued for 48 h. 18.41 kg. benzoic acid were fed, and 5.27 kg. were recovered from the drainage; 13.14 kg. of benzoic acid were therefore consumed. 8.3 kg. phenol were obtained in the condensed product and 0.683 kg. from the drainage; the total therefore was 8.983 kg., which corresponds to 11.62 kg. of benzoic acid. The yield was 11.62×100/13.14=89%.

The pitches thus produced (removed from the drainage) were only 0.7 kg., corresponding to 6 g. per 100 g. of produced phenol.

*Example 7*

In the plant described, a run was carried out under the following conditions: The initial feed of the reactor consisted of about 10 liters of molten benzoic acid containing 1.1% CuO and 1.3% MgO. The run was carried out at 240° C. (internal temperature of the reactor) and under atmospheric pressure. The subsequent feed consisted of:

| | |
|---|---|
| Benzoic acid | (¹) |
| Air _____l./h__ | 450 |
| Recycle gas _____l./h__ | 1300 |
| Steam _____g./h__ | 400 |

³ About 1.4 kg./h., containing CuO and MgO.

The drain was about 400 cc./h. (at the end the average value was 457 g./h.). 100 h. after starting of the run, it was noticed that the concentration of pitches in the drain remained constant, and then a balance was carried out for the next 70 h. of operation. During the run 98.7 kg. of benzoic acid were fed, containing on the whole 350 g. CuO and 415 g. MgO. The condensed product obtained from the overflow 16 and from the column 4 (which at the beginning of the balance had been filled with fresh water) contained:

| | Kg. |
|---|---|
| Phenol | 27.2 |
| Benzoic acid | 30 |
| Phenyl oxide and other substances | 0.21 |

In the drainage were contained:

| | |
|---|---|
| Phenol (as phenyl benzoate) | 4.25 |
| Benzoic acid (free and bound) | 26.15 |
| Pitches | 1.85 |
| CuO (as benzoate) | 0.35 |
| MgO (as benzoate) | 0.415 |

Therefore, the results of the run are the following:

phenol produced=27.2+4.25=31.45 kg.
benzoic acid consumed=98.7−30−26.15=42.55 kg.

$$\text{yield} = 31.45 \times \frac{122}{94} \times \frac{100}{42.55} = 96\%$$

$$\text{pitches (in grams per 100 g. phenol)} = \frac{1.85}{31.45} \times 100 = 5.9$$

In the gas vented to the atmosphere the presence of benzene in the amount of 4.5 g./h. has been ascertained.

By referring to the products found, the results are the following:

$$\text{benzoic acid into phenol} = 31.45 \times \frac{122}{94} = 40.8 \text{ kg.}$$

$$\text{benzoic acid into pitches }^1 = 1.85 \times \frac{244}{200} = 2.26 \text{ kg.}$$

¹ For the pitches a molecular weight of 200 has been assumed, derived from two mols benzoic acid.

$$\text{benzoic acid into } C_6H_6 = 4.5 \times \frac{70 \times 122}{78 \times 1000} = 0.49 \text{ kg.}$$

benzoic acid into phenyl oxide (and other) =

$$0.21 \times \frac{240}{170} = 0.3 \text{ kg.}$$

total of benzoic acid transformed=43.85 kg.

$$\text{yield on benzoic acid transformed} = \frac{40.8}{43.85} \times 100 = 93\%$$

We claim:

In the process for the production of phenol by catalytic oxidation of benzoic acid with oxidizing gases at atmospheric pressure and temperatures of about 230–250° C. in the presence of 1 to 2% by weight of copper salts as catalyst and catalysis promoters, the improvement which comprises: carrying out the oxidation in reactors at least lined with Hastelloy C and in heat exchange relationship with a thermostatic liquid, with an oxidizing air flow corresponding to 2–20 liters per hour of oxygen per kg. of reaction mixture and with a steam flow corresponding to 100–250 g. per 100 g. of produced phenol, and diluting the mixture of entering oxidizing gases and steam with inert gases recycled from the exit gases to have in the exit gases a ratio, by volume, of inert gases and steam to phenol between 10:1 and 30:1 and draining off a portion of the reacted reaction mixture to prevent accumulation of pitches.

References Cited by the Examiner

UNITED STATES PATENTS 2,727,926   12/1955   Kaeding et al. _____ 260—621

OTHER REFERENCES

Kaeding et al., Industrial and Eng. Chem., 53: 805–808 (1961), 4 pages.

LEON ZITVER, *Primary Examiner.*

HAROLD G. MOORE, *Examiner.*

D. M. HELFER, *Assistant Examiner.*